United States Patent
Seibert et al.

(10) Patent No.: US 11,422,530 B2
(45) Date of Patent: Aug. 23, 2022

(54) SYSTEMS AND METHODS FOR PROTOTYPING A VIRTUAL MODEL

(71) Applicant: Dell Products, L.P., Round Rock, TX (US)

(72) Inventors: Philip M. Seibert, Austin, TX (US); Anantha K. Boyapalle, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 29 days.

(21) Appl. No.: 16/105,188

(22) Filed: Aug. 20, 2018

(65) Prior Publication Data
US 2020/0057425 A1   Feb. 20, 2020

(51) Int. Cl.
*G05B 19/4099* (2006.01)
*G06T 19/00* (2011.01)
(Continued)

(52) U.S. Cl.
CPC .......... *G05B 19/4099* (2013.01); *B33Y 50/02* (2014.12); *G06F 3/011* (2013.01); *G06F 3/013* (2013.01); *G06F 3/017* (2013.01); *G06F 3/04845* (2013.01); *G06T 19/006* (2013.01); *B33Y 50/00* (2014.12); *G05B 2219/35134* (2013.01); *G05B 2219/49007* (2013.01); *G06F 3/04815* (2013.01)

(58) Field of Classification Search
CPC .......................................... G05B 2219/49007
USPC .......................................................... 700/98
See application file for complete search history.

(56) References Cited

U.S. PATENT DOCUMENTS

| 8,847,953 B1* | 9/2014 | Cho ..................... G02B 27/017 345/420 |
| 2009/0051758 A1* | 2/2009 | Endo ....................... G06F 3/012 348/53 |

(Continued)

FOREIGN PATENT DOCUMENTS

| CN | 107065195 A | * | 8/2017 | ........... G02B 27/017 |
| WO | WO-0062539 A1 | * | 10/2000 | ............... H04N 1/40 |

OTHER PUBLICATIONS

Atwell, "3D Printing and VR" May 10, 2017, accessed at: https://www.machinedesign.com/3d-printing-cad/article/21835 (9pg PDF) (Year: 2017).*

(Continued)

*Primary Examiner* — Emilio J Saavedra
(74) *Attorney, Agent, or Firm* — Fogarty LLP

(57) ABSTRACT

Systems and methods for prototyping a virtual model are described. In some embodiments, an Information Handling System (IHS) may include a host processor and a memory coupled to the host processor, the memory having program instructions stored thereon that, upon execution, cause the IHS to: produce a virtual object for display by a Head-Mounted Device (HMD) coupled to the IHS during execution of a virtual, augmented, or mixed reality (xR) application; execute a command with respect to the virtual object to produce a manipulated virtual object displayed by the HMD; and transmit an electronic file corresponding to the manipulated virtual object to a three-dimensional (3D) printer coupled to the IHS, where the electronic file enables the 3D printer to build a physical instance of the manipulated virtual object.

20 Claims, 7 Drawing Sheets

(51) Int. Cl.
*G06F 3/01* (2006.01)
*G06F 3/04845* (2022.01)
*B33Y 50/02* (2015.01)
*G06F 3/04815* (2022.01)
*B33Y 50/00* (2015.01)

(56) References Cited

U.S. PATENT DOCUMENTS

| | | | | |
|---|---|---|---|---|
| 2011/0004331 | A1* | 1/2011 | Cinader, Jr. | B33Y 80/00 |
| | | | | 700/98 |
| 2015/0005919 | A1* | 1/2015 | McGatha | B29C 64/386 |
| | | | | 700/119 |
| 2015/0331576 | A1* | 11/2015 | Piya | G06F 3/04815 |
| | | | | 715/850 |
| 2016/0217617 | A1* | 7/2016 | Barribeau | H04N 1/00307 |
| 2017/0160800 | A1* | 6/2017 | Reunamaki | G06F 3/012 |
| 2018/0096507 | A1* | 4/2018 | Valdivia | G06F 1/163 |
| 2019/0095418 | A1* | 3/2019 | Gonzalez | G06K 15/1856 |
| 2019/0347865 | A1* | 11/2019 | Hackett | G06F 30/00 |
| 2019/0361236 | A1* | 11/2019 | Hu | G02B 27/0101 |
| 2020/0051337 | A1* | 2/2020 | Reynolds | H04N 13/128 |
| 2020/0278763 | A1* | 9/2020 | Munakata | G06F 3/03545 |

OTHER PUBLICATIONS

Aoki et al., "AR basedornamentdesignsystemfor3Dprinting" Journal of Computational Design and Engineering vol. 2, 2015, pp. 47-54 (Year: 2015).*

National Institutes of Health FAQ, "What is the X3D file format? How can I use it?" accessed at: https://web.archive.org/web/20160301231829/https://3dprint.nih.gov/faqs/3308 Mar. 1, 2016, 2 page PDF print out (Year: 2016).*

Web3D Consortium, "What is the X3D?" accessed at: https://web.archive.org/web/20161028230732/https://www.web3d.org/x3d/what-x3d Oct. 28, 2016, 2 page PDF print out (Year: 2016).*

"X3D File Structure" accessed at: https://docs.fileformat.com/3d/x3d/ Dec. 17, 2020, 4 page PDF print out (Year: 2020).*

Web3D Consortium, "What is the X3D?" accessed at: https://web.archive.org/web/20180630182753/https://www.web3d.org/x3d/what-x3d Jun. 30, 2018, 2 page PDF print out (Year: 2018).*

Toma et al., "A comparative evaluation of human interaction for design and assembly of 3D CAD models in desktop and immersive environments" International Journal on Interactive Design and Manufacturing (2012) Iss 6, pp. 179-193 (Year: 2012).*

Kostic et al., "Comparative Study of CAD Software, Web3D Technologies and Existing Solutions to Support Distance-Learning Students of Engineering Profile" IJCSI International Journal of Computer Science Issues, vol. 9, Issue 4, No. 2, Jul. 2012, pp. 181-187 (Year: 2012).*

Karner, "Everything you need to know about MakeVR" accessed at https://web.archive.org/web/20170505154856/http://www.vrheads.com/everything-you-need-know-about-makevr, May 2017, 7 page print out (Year: 2017).*

Swirlx3d, "Tutorial: Basic 3D Geometry" accessed at https://web.archive.org/web/20110126052328/http://www.swirlx3d.com:80/tut01.php, Jan. 2011, 4 page print out (Year: 2011).*

ACM SIGCHI, "RoMA: Interactive Fabrication with Augmented Reality and a Robotic 3D Printer" https://www.youtube.com/watch?v=WKx560SNsKQ Published Apr. 7, 2018, 35 seconds, 1 pg PDF screen capture. (Year: 2018).*

ACM SIGCHI, "RoMA: Interactive Fabrication with Augmented Reality and a Robotic 3D Printer" YouTube video accessed at https://www.youtube.com/watch?v=sKRnelCyaV4, May 15, 2018, 18 mins 46 sec, 9 page PDF printout (Year: 2018).*

* cited by examiner

SYSTEMS AND METHODS FOR PROTOTYPING A VIRTUAL MODEL

FIELD

The present disclosure generally relates to Information Handling Systems (IHSs), and, more particularly, to systems and methods for prototyping a virtual model.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible. In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In various implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for prototyping a virtual model are described. In an illustrative, non-limiting embodiment, an Information Handling System (IHS) may include a host processor and a memory coupled to the host processor, the memory having program instructions stored thereon that, upon execution, cause the IHS to: produce a virtual object for display by a Head-Mounted Device (HMD) coupled to the IHS during execution of a virtual, augmented, or mixed reality (xR) application; execute a command with respect to the virtual object to produce a manipulated virtual object displayed by the HMD; generate an electronic file in an Extensible Markup Language (XML) format, where the XML file describes the manipulated virtual object; and transmit the electronic file to a three-dimensional (3D) printer coupled to the IHS, where the electronic file enables the 3D printer to build a physical instance of the manipulated virtual object.

In various implementations, the virtual object may be displayed by the HMD as a digital image overlaid upon a user's natural visual perception of a surrounding physical environment. The command may include a gesture captured by the HMD. The gesture may move the manipulated virtual object to a print area of the 3D printer. The 3D printer may be displayed by the HMD as a digitally-generated image.

Additionally, or alternatively, the 3D printer may be naturally visible as part of a surrounding physical environment. For example, the 3D printer may include a fiducial mark. The fiducial mark further may include an infrared Light-Emitting Diode (LED). In those cases, the program instructions may cause the IHS to determine that the gesture places the manipulated virtual object in the print area based upon detection of a position of the fiducial mark in the user's Field-of-View (FOV).

The program instructions may cause the IHS to determine that the gesture places the manipulated virtual object in the print area based upon detection of a gaze focus matching a location of the print area. In some cases, the program instructions may also cause the IHS to: instruct the 3D printer to initiate reproduction of the physical instance of the manipulated virtual object; and overlay the virtual object over the physical instance concurrently with the physical instance being built by the 3D printer. The program instructions may further cause the IHS to convert the electronic file from the XML format to a 3D Manufacturing Format (3MF) format using an Application Programming Interface (API) prior to the transmission.

In another illustrative, non-limiting embodiment, a hardware memory device may have program instructions stored thereon that, upon execution by a hardware processor of a 3D printer, cause the 3D printer to: receive an electronic file corresponding to a manipulated virtual object from an IHS coupled to an HMD during execution of an xR application, where a virtual object is produced by the IHS during the xR application and the IHS is configured to execute a command with respect to the virtual object to produce a manipulated virtual object; and build a physical instance of the manipulated virtual object.

The virtual object may be displayed by the HMD as a digital image overlaid upon a user's natural visual perception of a surrounding physical environment. The command may include a gesture captured by the HMD, where the gesture moves the manipulated virtual object to a print area of the 3D printer. The program instructions, upon execution, may cause the IHS to determine that the gesture places the manipulated virtual object in the print area based upon detection of a position of one or more fiducial marks coupled to the printer and present in the user's FOV. Additionally, or alternatively, the program instructions, upon execution, may cause the IHS to determine that the gesture places the manipulated virtual object in the print area based upon detection of a gaze focus matching a location of the print area.

In yet another illustrative, non-limiting embodiment a method may include: producing a virtual object for display by an HMD coupled to the IHS during execution of an xR application; executing a command with respect to the virtual object to produce a manipulated virtual object displayed by the HMD; and transmitting an electronic file corresponding to the manipulated virtual object to a 3D printer coupled to the IHS, where the electronic file enables the 3D printer to build a physical instance of the manipulated virtual object. The method may include instructing the 3D printer to initiate reproduction of the physical instance of the manipulated virtual object; and overlaying the virtual object over the physical instance concurrently with the physical instance being built by the 3D printer. The method may also include converting the electronic file from an XML format to a 3MF format using an API.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein relate to systems and methods for prototyping a virtual model as part of a virtual, augmented, and mixed reality (xR) application. These techniques are particularly useful in xR applications that employ HMDs, Heads-Up Displays (HUDs), and eyeglasses—collectively referred to as "HMDs."

Figure 1:
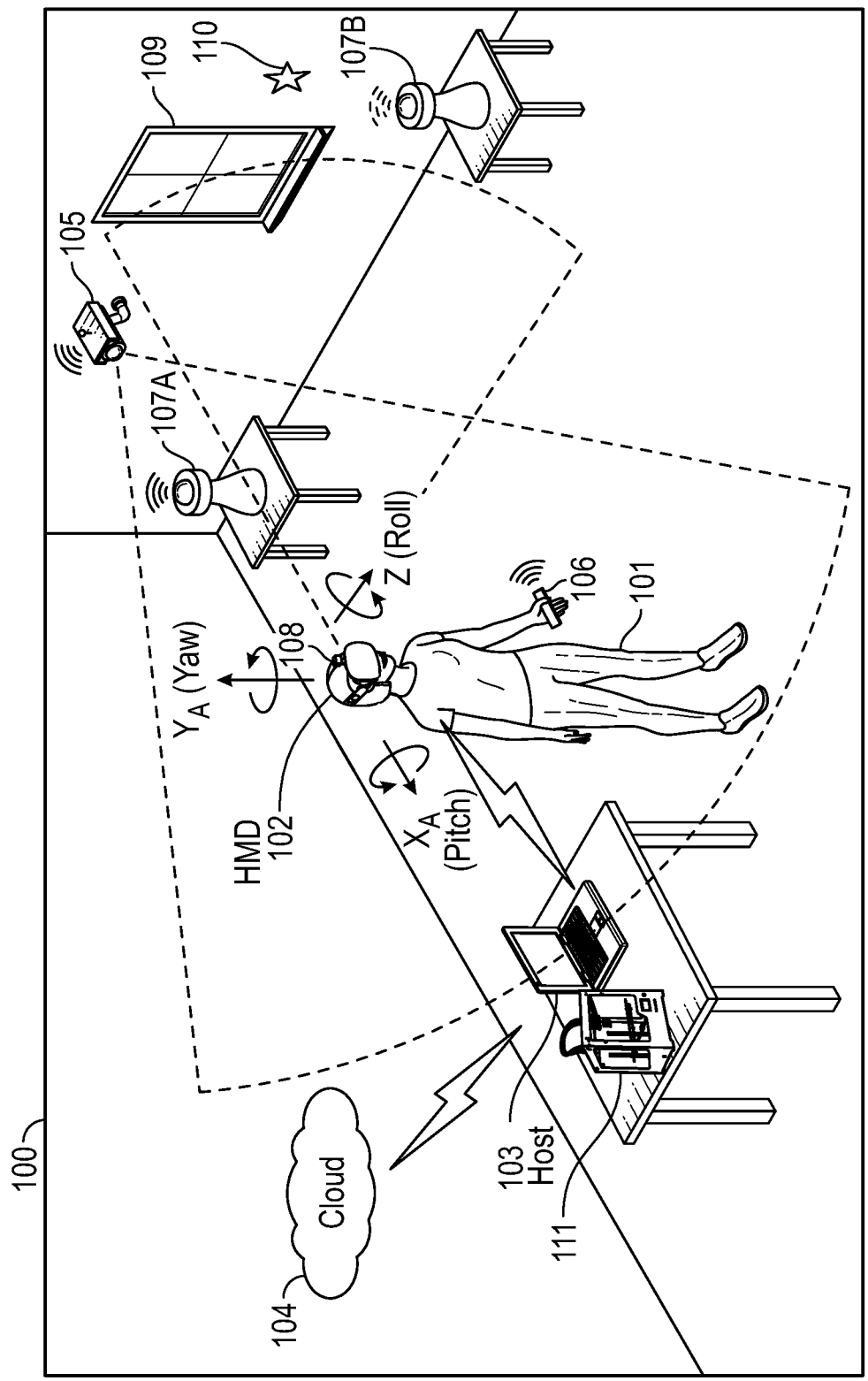
FIG. 1 is a perspective view of an example of a physical environment where a virtual, augmented, and mixed reality (xR) application is executed, according to some embodiments.

FIG. 1 is a perspective view of environment 100 where an xR application is executed. As illustrated, user 101 wears HMD 102 around his or her head and over his or her eyes. In this non-limiting example, HMD 102 is tethered to host Information Handling System (IHS) 103 via a wired or wireless connection. In some cases, host IHS 103 may be built into (or otherwise coupled to) a backpack or vest, wearable by user 101.

In environment 100, the xR application may include a subset of components or objects operated by HMD 102 and another subset of components or objects operated by host IHS 103. Particularly, host IHS 103 may be used to generate digital images to be displayed by HMD 102. HMD 102 transmits information to host IHS 103 regarding the state of user 101, such as physical position, pose or head orientation, gaze focus, etc., which in turn enables host IHS 103 to determine which image or frame to display to the user next, and from which perspective.

As user 101 moves about environment 100, changes in: (i) physical location (e.g., Euclidian or Cartesian coordinates x, y, and z) or translation; and/or (ii) orientation (e.g., pitch, yaw, and roll) or rotation, cause host IHS 103 to effect a corresponding change in the picture or symbols displayed to user 101 via HMD 102, in the form of one or more rendered video frames.

Movement of the user's head and gaze may be detected by HMD 102 and processed by host IHS 103, for example, to render video frames that maintain visual congruence with the outside world and/or to allow user 101 to look around a consistent virtual reality environment. In some cases, xR application components executed by HMD 102 and IHS 103 may provide a cooperative, at least partially shared, xR environment between a plurality of users. For example, each user may wear their own HMD tethered to a different host IHS, such as in the form of a video game or a productivity application (e.g., a virtual meeting).

As used herein, the term SLAM refers systems and methods that use positional tracking devices to construct a map of an unknown environment where an HMD is located, and that simultaneously identifies where the HMD is located, its orientation, and/or pose.

Generally, SLAM methods implemented in connection with xR applications may include a propagation component, a feature extraction component, a mapping component, and an update component. The propagation component may receive angular velocity and accelerometer data from an Inertial Measurement Unit (IMU) built into the HMD, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as the HMD moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

To enable positional tracking for SLAM purposes, HMD 102 may use wireless, inertial, acoustic, or optical sensors. And, in many embodiments, each different SLAM method may use a different positional tracking source or device. For example, wireless tracking may use a set of anchors or lighthouses 107A-B that are placed around the perimeter of environment 100 and/or one or more tokens 106 or tags 110 that are tracked; such that HMD 102 triangulates its position and/or state using those elements. Inertial tracking may use data from an accelerometer and/or gyroscope within HMD 102 to find a velocity (e.g., m/s) and position of HMD 102 relative to some initial point. Acoustic tracking may use ultrasonic sensors to determine the position of HMD 102 by measuring time-of-arrival and/or phase coherence of transmitted and receive sound waves.

Optical tracking may include any suitable computer vision algorithm and tracking device, such as a camera of visible, infrared (IR), or near-IR (NIR) range, a stereo camera, and/or a depth camera. With inside-out tracking using markers, for example, camera 108 may be embedded in HMD 102, and infrared markers 107A-B or tag 110 may be placed in known stationary locations. With outside-in tracking, camera 105 may be placed in a stationary location and infrared markers 106 may be placed on HMD 102 or held by user 101. In other cases, markerless inside-out tracking may use continuous searches and feature extraction techniques from video frames obtained by camera 108 (e.g., using visual odometry) to find natural visual landmarks (e.g., window 109) in environment 100.

In various embodiments, data obtained from a positional tracking system and technique employed by HMD 102 may be received by host IHS 103, which in turn executes the SLAM method of an xR application. In the case of an inside-out SLAM method, for example, an xR application receives the position and orientation information from HMD 102, determines the position of selected features in the images captured by camera 108, and corrects the localization of landmarks in space using comparisons and predictions.

An estimator, such as an Extended Kalman filter (EKF) or the like, may be used for handling the propagation component of an inside-out SLAM method. A map may be generated as a vector stacking sensors and landmarks states, modeled by a Gaussian variable. The map may be maintained using predictions (e.g., when HMD 102 moves) and/or corrections (e.g., camera 108 observes landmarks in the environment that have been previously mapped). In other cases, a map of environment 100 may be obtained, at least in part, from cloud 104.

In various xR applications, environment 100 also includes three-dimensional (3D) printer 111 coupled to host IHS 103 (and/or to its own host IHS). As used herein, the term "3D printing" refers to systems and processes in which material is joined or solidified under computer control to create a physical instance of a 3D object or prototype, with material being added together (e.g., liquid molecules or powder grains), often in successive layers. In various implementations, 3D printer 111 may be a rapid prototyping (RP) or additive manufacturing (AM) machine, and it may use employ any suitable technology, such as stereolithography (SLA) or fused deposit modeling (FDM). In operation, 3D printing 111 may produce, reproduce, and/or build a 3D object from a computer-aided design (CAD) model or other electronic file.

Figure 2:
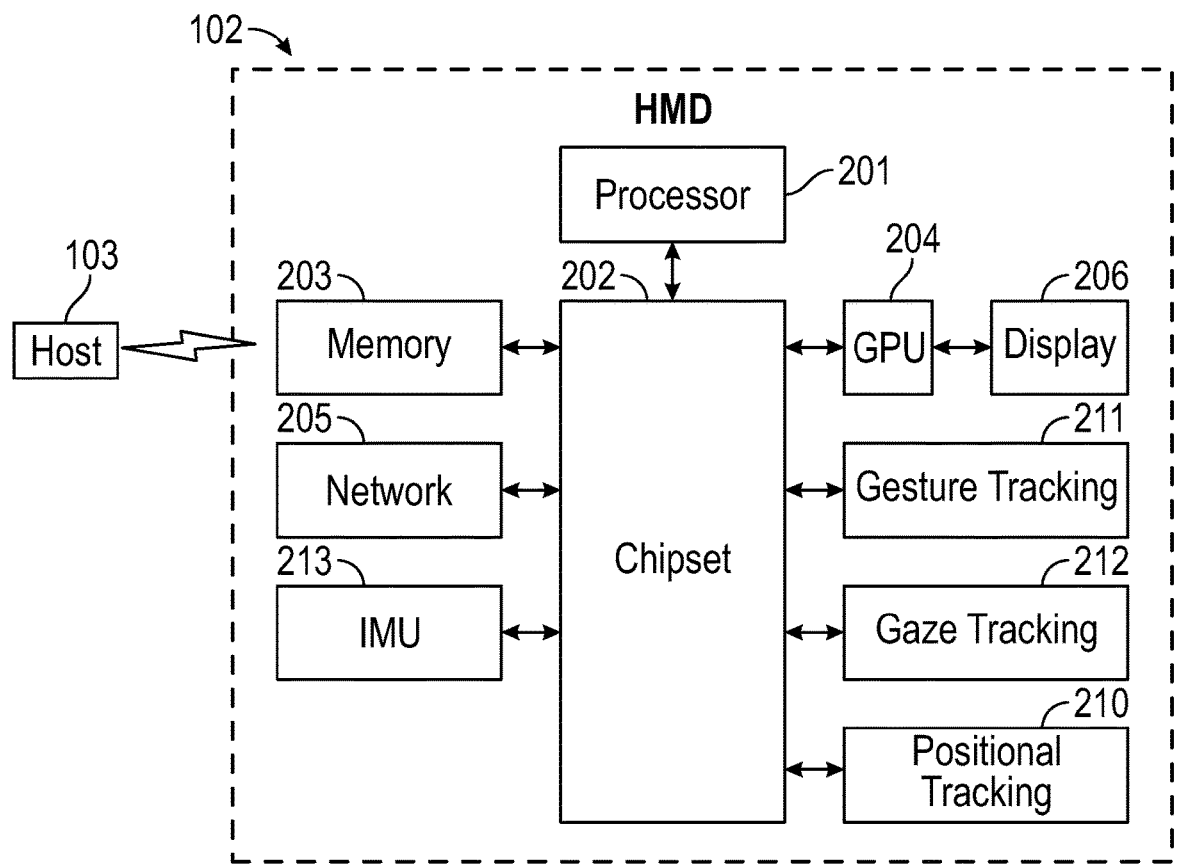
FIG. 2 is a block diagram of an example of a Head-Mounted Display (HMD) and a host Information Handling System (IHS), according to some embodiments.

FIG. 2 is a block diagram of an example HMD 102 and host IHS 103, according to some embodiments. As depicted, HMD 102 includes components configured to display an all-immersive virtual environment and/or to overlay digitally-created content or images on a display, panel, or surface (e.g., an LCD panel, an OLED film, a projection surface, etc.), in place of and/or in addition to the user's natural visual perception of the real-world.

As shown, HMD 102 includes processor 201. In various embodiments, HMD 102 may be a single-processor system, or a multi-processor system including two or more processors. Processor 201 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

HMD 102 includes chipset 202 coupled to processor 201. In certain embodiments, chipset 202 may utilize a QuickPath Interconnect (QPI) bus to communicate with processor 201. In various embodiments, chipset 202 provides processor 201 with access to a number of resources. For example, chipset 202 may be coupled to network interface 205 to enable communications via various wired and/or wireless networks. Chipset 202 may also be coupled to display controller or graphics processor (GPU) 204 via a graphics bus, such as an Accelerated Graphics Port (AGP) or Peripheral Component Interconnect Express (PCIe) bus. As shown, graphics processor 204 provides video or display signals to display 206.

Chipset 202 further provides processor 201 and/or GPU 204 with access to memory 203. In various embodiments, memory 203 may be implemented using any suitable memory technology, such as static RAM (SRAM), dynamic RAM (DRAM) or magnetic disks, or any nonvolatile/Flash-type memory, such as a solid-state drive (SSD) or the like. Memory 203 may store program instructions that, upon execution by processor 201 and/or GPU 204, present an xR application to user 101 wearing HMD 102.

Other resources coupled to processor 201 through chipset 202 may include, but are not limited to: positional tracking system 210, gesture tracking system 211, gaze tracking system 212, and inertial measurement unit (IMU) system 213.

In some embodiments, positional tracking system 210 may include one or more optical sensors (e.g., a camera 108) configured to determine how HMD 102 moves in relation to environment 100. For example, an inside-out tracking system 210 may be configured to implement tracking techniques that use distinctive visual characteristics of the physical environment to identify specific images or shapes which are then usable to calculate HMD 102's position and orientation.

Gesture tracking system 211 may include one or more cameras or optical sensors that enable user 101 to use their actual hands for interaction with virtual objects (VOs) rendered by HMD 102. For example, gesture tracking system 211 may be configured to implement hand tracking and gesture recognition in a 3D-space via a user-facing 2D camera. In some cases, gesture tracking system 211 may track a selectable number of degrees-of-freedom (DOF) of motion, with depth information, to recognize dynamic hand gestures (e.g., swipes, clicking, tapping, grab and release, etc.) usable to control or otherwise interact with xR applications executed by HMD 102.

Gaze tracking system 212 may include an inward-facing projector configured to create a pattern of infrared or (near-infrared) light on the user's eyes, and an inward-facing camera configured to take high-frame-rate images of the eyes and their reflection patterns; which are then used to calculate the user's eye's position and gaze point. In some cases, gaze detection or tracking system 212 may be configured to identify a direction, extent, and/or speed of movement of the user's eyes in real-time, during execution of an xR application (e.g., a gaze vector). In addition, gaze detection or tracking system 212 may be configured to calculate a ROGI, of configurable size or shape (e.g., rectangular), based in part upon a gaze vector obtained using eye/gaze tracking (EGT) processing.

IMU system 213 may include one or more accelerometers and gyroscopes configured to measure and report a specific force and/or angular rate of the user's head. In some cases, IMU system 213 may be configured to a detect a direction, extent, and/or speed of rotation (e.g., an angular speed) of the user's head in real-time, during execution of an xR application.

In some implementations, HMD 102 may communicate with host IHS 103 via wired or wireless connections (e.g., WiGig, WiFi, etc.). For example, if host IHS 103 has more processing power and/or better battery life than HMD 102, host IHS 103 may be used to offload some of the processing involved in the creation of the xR experience. In some cases, host IHS 103 may be built into (or otherwise coupled to) a backpack or vest, wearable by user 101.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

In various embodiments, HMD 102 and/or host IHS 103 may not include each of the components shown in FIG. 2. Additionally, or alternatively, HMD 102 and/or host IHS 103 may include components in addition to those shown in FIG. 2. Furthermore, components represented as discrete entities in FIG. 2 may, in some embodiments, be integrated with other components. In various implementations, all or a portion of the functionality provided by the illustrated components may be provided by components integrated as a System-On-Chip (SOC), or the like.

As xR technologies become more mainstream, new products are now providing integration between AR and VR for viewing and designing prototypes of 3D objects. However, the conventional workflow from "AR viewing" to "first physical prototype" can be cumbersome. For example, orienting and setting up a 3D model to be printed typically requires the user to go back and forth between the HMD and the host IHS, and can be non-intuitive. Moreover, pre-prototyping in 3D xR, returning to a traditional IHS monitor to initiate a 3D print, and then actually printing in 3D, is a 3D-to-2D-to-3D experience—it would be more intuitive to provide a workflow that takes place entirely in 3D xR.

To address these, and other problems, systems and methods described herein enable an entire workflow, from the initial viewing of a 3D model in AR to a physical rapid prototype, using a full xR interface. In some cases, a 3D printer may be coupled to the same host IHS as the HMD. In other cases, the 3D printer may have its own dedicated IHS. Moreover, a rapid prototyping system can accept commands initiated from the user's interaction with the HMD.

In some embodiments, a 3D printer may be marked with fiducial points or other locating features to allow precise tracking by the HMD. Fiducial points may include visible markings, infrared LEDs, or the like. Additionally, or alternatively, the 3D printer may be remote with respect to the user and the HMD, and instead the 3D printer may be represented in AR virtually (e.g., a digital icon, image, or the like).

In a generic use-case, a user views a 3D virtual object or model in AR. The user then approaches a 3D printer. The 3D printer may be physically present and identified and located by the HMD's tracking capabilities, or the 3D printer may be a virtual representation of a physical 3d printer. The user employs a gesture to grasp the VO and to place it in the 3D printer. The user orients the VO and configures the printer in AR. The user initiates a new build at this time.

As such, systems and methods described herein introduce the concept of "what you see is what you get" (WYSIWYG) for 3D printing using an xR print interface, including the creation of a physical prototype based on the placement, scale, orientation and other qualities of a VO. The configuration of the physical prototyping equipment may be based on the user's placement of the VO relative to: (i) the physical prototyping equipment, or (ii) A virtual representation of physical prototyping equipment.

In some cases, certain techniques described herein may be implemented using an Operating System (OS) 3D print Application Programming Interface (API) to convert a VO into a physical object.

Figure 3:
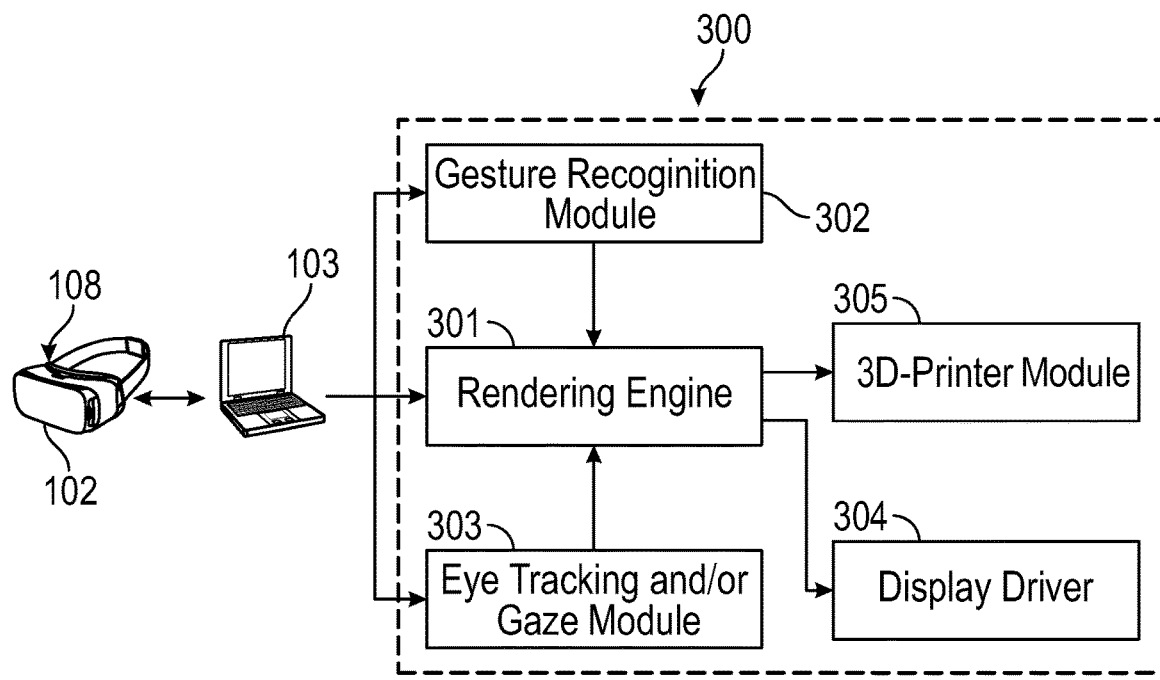
FIG. 3 is a block diagram of an example of an xR application for prototyping a virtual model, according to some embodiments.

FIG. 3 is a block diagram of an example of xR application 300 for prototyping a VO. In some embodiments, components 300 may be provided in the form of electronic circuits and/or programmable instructions stored in a hardware memory that, upon execution by a processor, cause the processor to perform one or more of the operations described below.

Particularly, HMD 102 communicates information to host IHS such as, for example, SLAM information (e.g., NIR camera frames), inside-out camera information (e.g., from gesture or SLAM camera 108), and/or gaze information. As shown, host IHS 103 transmits SLAM information to rendering engine 301, inside-out camera images to gesture recognition module 302, and eye tracking frames to eye tracking and/or gaze module 303.

Generally, gesture detection begins when video frame data (e.g., a video or depth-video stream) is received at host IHS 103 from camera 108 of HMD 102. In some implementations, video data may have already been processed, to some degree, by gesture tracking component 211 of HMD 102. Then, the video data is further processed by gesture recognition module 302 to control aspects of xR application 300, by identifying various gestures and gesture sequences that constitute user input to xR application 300.

At least a portion of the user's body may be identified in the video frame data obtained using camera 108 using gesture recognition module 302. For example, through image processing, a given locus of a video frame or depth map may be recognized as belonging to user 101. Pixels that belong to user 101 (e.g., arms, hands, fingers, etc.) may be identified, for example, by sectioning off a portion of the video frame or depth map that exhibits above-threshold motion over a suitable time scale, and attempting to fit that section to a generalized geometric model of user 101. If a suitable fit is achieved, then pixels in that section may be recognized as those of user 101.

Gesture recognition module 302 may be configured to analyze pixels of a video frame or depth map that correspond to user 101, in order to determine what part of the user's body each pixel represents. A number of different body-part assignment techniques may be used. In an example, each pixel of the video frame or depth map may be assigned a body-part index. The body-part index may include a discrete identifier, confidence value, and/or body-part probability distribution indicating the body part or parts to which that pixel is likely to correspond.

For example, machine-learning may be used to assign each pixel a body-part index and/or body-part probability distribution. Such a machine-learning method may analyze a user with reference to information learned from a previously trained collection of known gestures and/or poses stored in a calibration database. During a supervised training phase, for example, a variety of gesture sequences may be observed, and trainers may provide label various classifiers in the observed data. The observed data and annotations may then be used to generate one or more machine-learned algorithms that map inputs (e.g., observation data from a depth camera) to desired outputs (e.g., body-part indices for relevant pixels).

Thereafter, a partial virtual skeleton may be fit to at least one body part identified. In some embodiments, a partial virtual skeleton may be fit to the pixels of video frame or depth data that correspond to a human arm, hand, and/or finger(s). A body-part designation may be assigned to each skeletal segment and/or each joint. Such virtual skeleton may include any type and number of skeletal segments and joints, including each individual finger).

In some embodiments, each joint may be assigned a number of parameters, such as, for example, Cartesian coordinates specifying joint position, angles specifying joint rotation, and other parameters specifying a conformation of the corresponding body part (e.g., hand open, hand closed, etc.). Skeletal-fitting algorithms may use the depth data in combination with other information, such as color-image data and/or kinetic data indicating how one locus of pixels moves with respect to another. Moreover, a virtual skeleton may be fit to each of a sequence of frames of depth video. By analyzing positional change in the various skeletal joints and/or segments, certain corresponding movements that indicate predetermined gestures, actions, or behavior patterns of user 101 may be identified.

In other embodiments, the use of a virtual skeleton may not be necessary. For example, in other implementations, raw point-cloud data may be sent directly to a feature extraction routine within gesture recognition module 302.

In contrast with gesture recognition module 302, eye tracking and/or gaze module 303 may use MR light sources to produce glints on the surface of the cornea of the user's eye, and then it may capture images of the eye region using an inward-facing camera. Eye tracking and/or gaze module 303 may estimate the user's gaze from the relative movement between the pupil center and glint positions. Particularly, an eye and/or gaze tracking algorithm may perform corneal reflection based calculations that use NIR illumination to estimate the gaze direction or the point of gaze using polynomial functions, or a geometrical model of the human eye.

To perform gaze estimation, eye tracking and/or gaze module 303 may estimate the visual axis and kappa angle of the user's eye, for each user, as part of a calibration operation. Calibration may be performed by showing the user a set of visual targets distributed over the HMD's display, and the user may be asked to gaze at them for a certain amount of time. The inward-facing camera may capture the various eye positions for each target point, which are then mapped to corresponding gaze coordinates.

In some cases, eye tracking and/or gaze module 303 may be configured to compensate for head movement. For example, a mathematical formula indicating the correspondence of eye gaze with head positions may represent a relationship between user reference gaze directions, head pose direction, and actual gaze direction; which is a result of both head and eye rotation.

In various embodiments, eye tracking and/or gaze module 303 may perform any of a plurality of different EGT methods. For example, in two-dimensional (2D) regression-based EGT methods, a vector between the pupil center and a corneal glint may be mapped to corresponding gaze coordinates on the frontal screen using a polynomial transformation function. Conversely, three-dimensional (3D)—based EGT methods may use a geometrical model of the human eye to estimate the center of the cornea, optical and visual axes of the eye, and to estimate the gaze coordinates as points of intersection where the visual axes meets the scene.

Cross-ratio -based EGT methods may project a pattern of MR lights on the eye of the user, and it may estimate the gaze position using invariant property of projective geometry. From the glint positions, the pupil and the size of the monitor screen, gaze location is estimated using two perspective projections. With these two projections, a transformation relating the scene and camera image planes is obtained, and the projection of the point-of-gaze on the scene plane to the image of the pupil center on the camera plane may be estimated.

In appearance-based EGT methods, information from the eye region is represented using a model trained with a set of features extracted from eye images. A statistical model may be used to represent shape and texture variations and trained using images of the eye region annotated with landmark points. The shape vector is the concatenated coordinates of all landmark points, and may be obtained using Principal Component Analysis (PCA).

Shape-based EGT methods may employ deformable templates of the eye region, using two parabolas for eye contours and circle for the iris, and fitting them to an eye image. These shape-based EGT methods may then find the similarity between the template of a chosen region with images of that region using a normalized cross-correlation, modified cross-correlation, or mean-square-error calculation.

As such, in various embodiments, eye tracking and/or gaze module 303 may produce collect, measure, and/or produce information about a user's intent, cognitive processes, and behavior, based upon the user's eye movements, that may include, but is not limited to: (A) Fixations: phases when the eyes are stationary between movements and visual input occurs (e.g., total fixation duration, mean fixation duration, fixation spatial density, number of areas fixated, fixation sequences and fixation rate); (B) Saccades: rapid and involuntary eye movements that occur between fixations (e.g., saccade number, amplitude and fixation-saccade ratio); (C) Scanpath: a series of short fixations and saccades alternating before the eyes reach a target location on the screen (e.g., scanpath direction, duration, length and area covered); (D) Gaze duration: a sum of all fixations made in an area of interest before the eyes leave that area and also the proportion of time spent in each area; and/or (E) Pupil size and blink: measures used to study cognitive workload.

Based upon the foregoing, eye tracking and/or gaze module 303 may be configured to follow the user's gaze direction for natural exploration of a visual scene by capturing the user's visual perspective. Moreover, eye tracking and/or gaze module 303 may also be configured to estimate user gaze and blink-state for interacting with the xR environment; several types of eye movements and gestures, such as saccades, smooth pursuit and nod-roll may be used. For example, eye tracking and/or gaze module 303 may be configured to use gaze, dwell time, and half-blink information for the purpose of hands-free object selection. Multiple input parameters may be used to avoid accidental selection of items. Pupil motion may be tracked to estimate a user's viewing point, with Kalman filtering to minimize pupil jitter and drifts.

Rendering engine 303 may include any engine (e.g., UNITY, UNREAL, AUTODESK, etc.) configured to render an xR model displayed by HMD 102 from user 101's unique point-of-view based upon the user's coordinate location (e.g., SLAM), the user's pose (e.g., IMU), and/or the user's gaze. Furthermore, xR application 300 also includes display driver 304 and 3D printer module 305—display driver 304 converts rendered video frames to a display format that HMD 102 can reproduce before the user's eyes, whereas 3D printer module 305 converts VOs to a format such that 3D printer 111 can build a physical instance of the VO.

Figure 4:
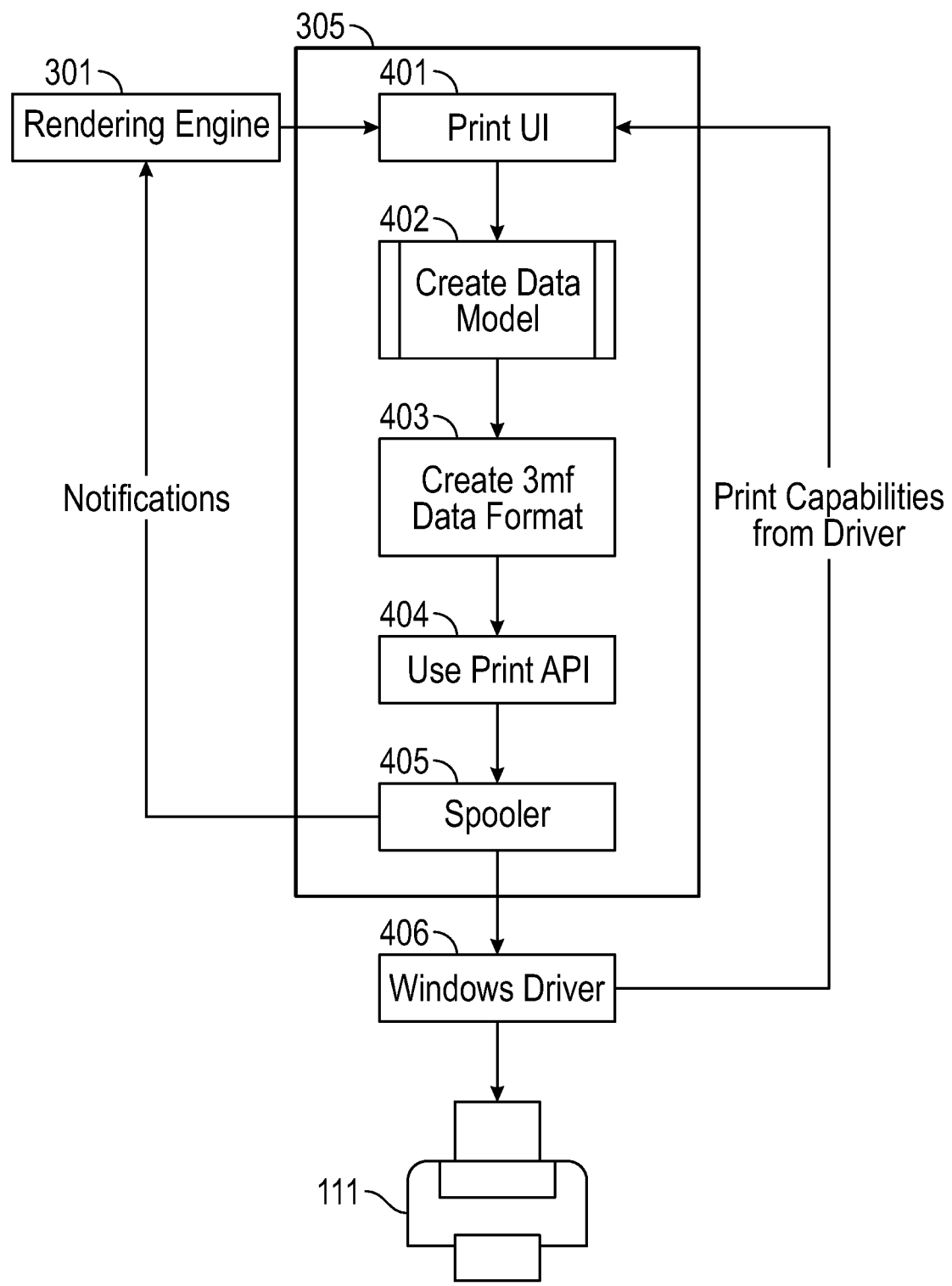
FIG. 4 is a block diagram of an example of a three-dimensional (3D) printer module, according to some embodiments.

FIG. 4 is a block diagram of an example of 3D printer module 305. Particularly, rendering engine 301 is coupled to print User Interface (UI) 401 of module 305. Print UI 401 is configured to generate a first electronic file of a VO, for example, in Extensible Markup Language (XML) format. In some implementations, Create Data Model 402 may enable the use of gestures to manipulate a VO, and to modify the electronic file to reflect the user's changes and edits to the VO, while the user continues to wear HMD 102.

Block 403 is configured to create a second electronic file in a 3D print format (e.g., 3MF) based upon the XML file(s), and each electronic file is assigned a print job ID. Block 404 uses an Operating System (OS)—based (e.g., WINDOWS, LINUX, MAC OS, etc.) Application Programming Interface (API) to send the second electronic file to spooler 405. Spooler 405 queues print jobs and sends them successively to OS (e.g., WINDOWS) driver 406, which causes printer 111 to reproduce a physical instance of the manipulated VO.

Figure 5A:
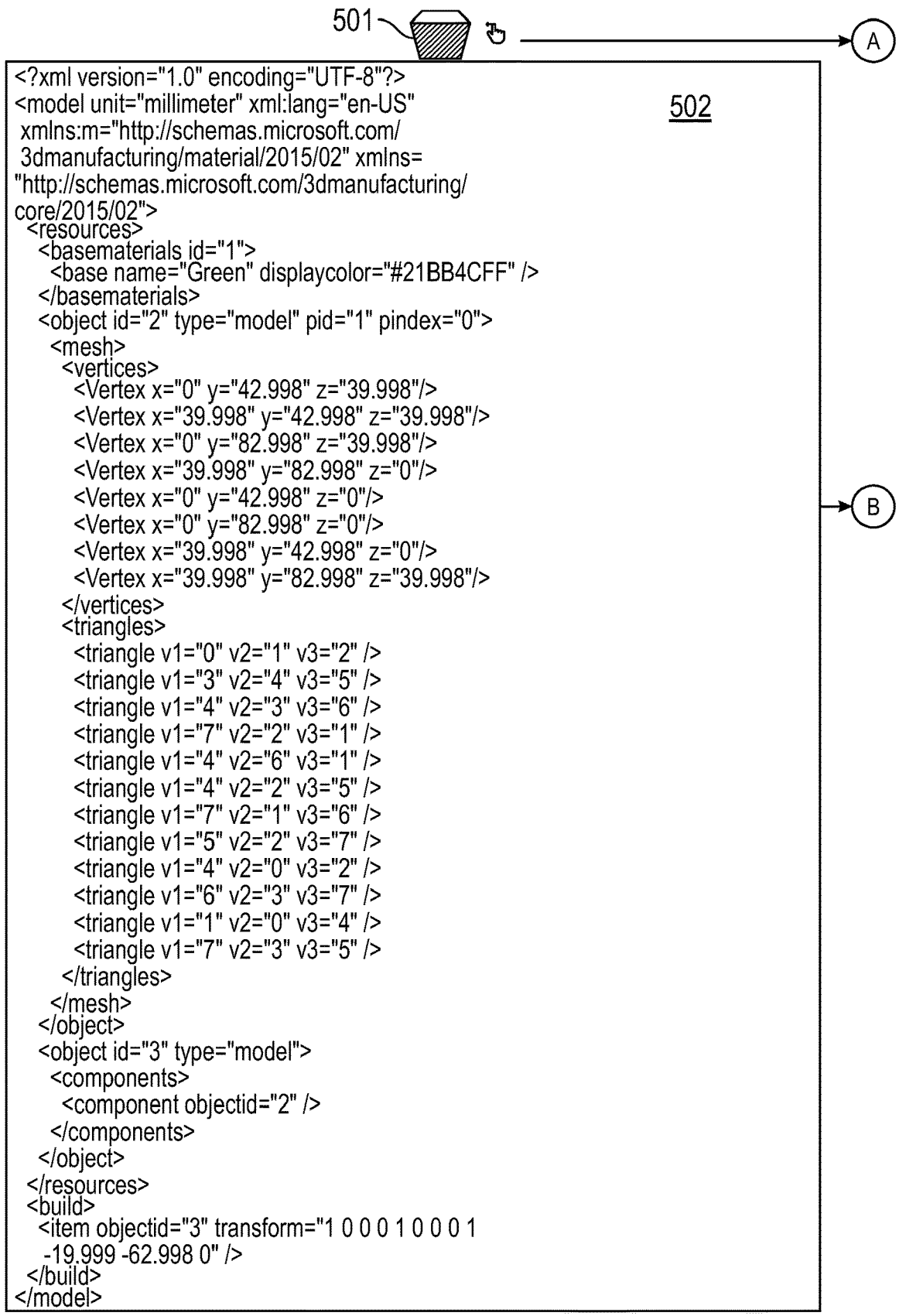
FIGS. 5A and 5B are a diagram showing an example of virtual object manipulation and corresponding electronic files, according to some embodiments.
Figure 5B:

FIGS. 5A and 5B are a diagram showing an example of VO manipulation and correspondingly produced electronic files. Particularly, VO 501 is shown in the form of a cube, which is described in first XML file 502. Upon detecting a user's gesture requesting that one of the sides have its color changed to "red," shown as manipulated VO 503, second XML file 504 is produced to reflect those changes or edits.

Figure 6:
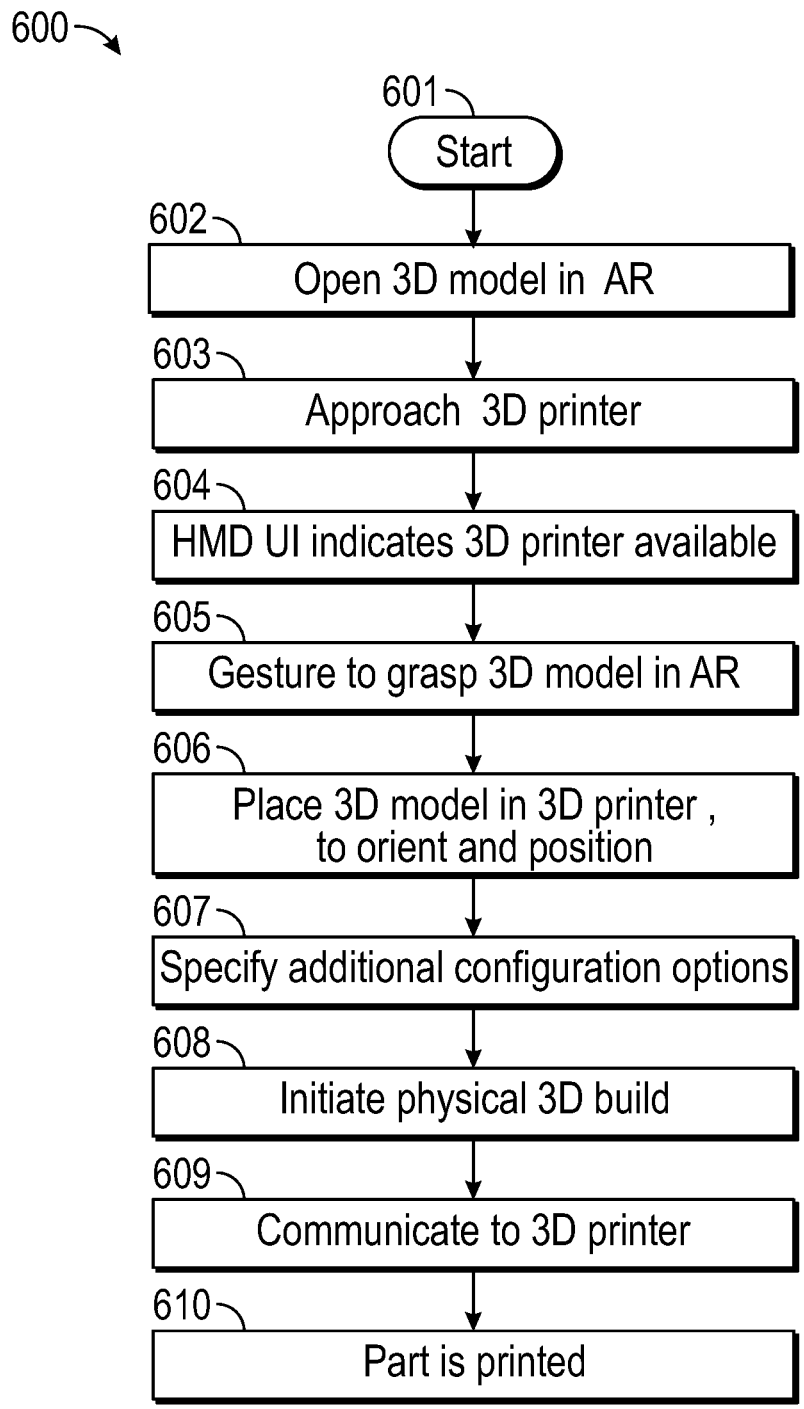
FIG. 6 is a flowchart of an example of a method for prototyping a virtual model, according to some embodiments.

FIG. 6 is a flowchart of an example of method 600 for prototyping a virtual model. Method 600 starts at block 601. At block 602, user 101, while wearing HMD 102, opens a 3D model or VO 501 in an XR application (in this case, AR), for example, using a hand gesture. At block 603, user 101 approaches 3D printer 111 in environment 100.

In many cases, 3D printer 111 is physically present and its location and features are identified and precisely tracked by HMD 102 by virtue of fiducial markings. In other cases, user may access 3D printer 111 virtually within AR. At block 604, HMD 102 indicates to user 101 that 3D printer 111 is available.

At block 605, user 101 gestures to "grab" or select the VO. At block 606, user 101 places the VO in 3D printer 111 (and/or over a digital image representing 3D printer 111), orients, and/or positions it within a print area. In some cases, a manipulated VO maybe placed in the print area based upon detection of a gaze focus matching the location of the print area, as determined by the presence of fiducial marks in the user's Field-of-View (FOV). At block 607, user 101 may use additional gestures to specify other configuration options (e.g., type of material to be injected, type of nozzle, scale or dimensions, texture, etc.).

In some implementations, the user may be given the option to watch a time-lapse pre-build of the VO, for example, overlaying the print area. The user may also add parts to the VO of the same or different geometries. At block 608, the user initiates the physical build of an instance of the VO. Block 609 communicates the VO's electronic file and/or other configuration options to 3D printer 111 (local or remote), and the part is printed at block 610.

Figure 7:
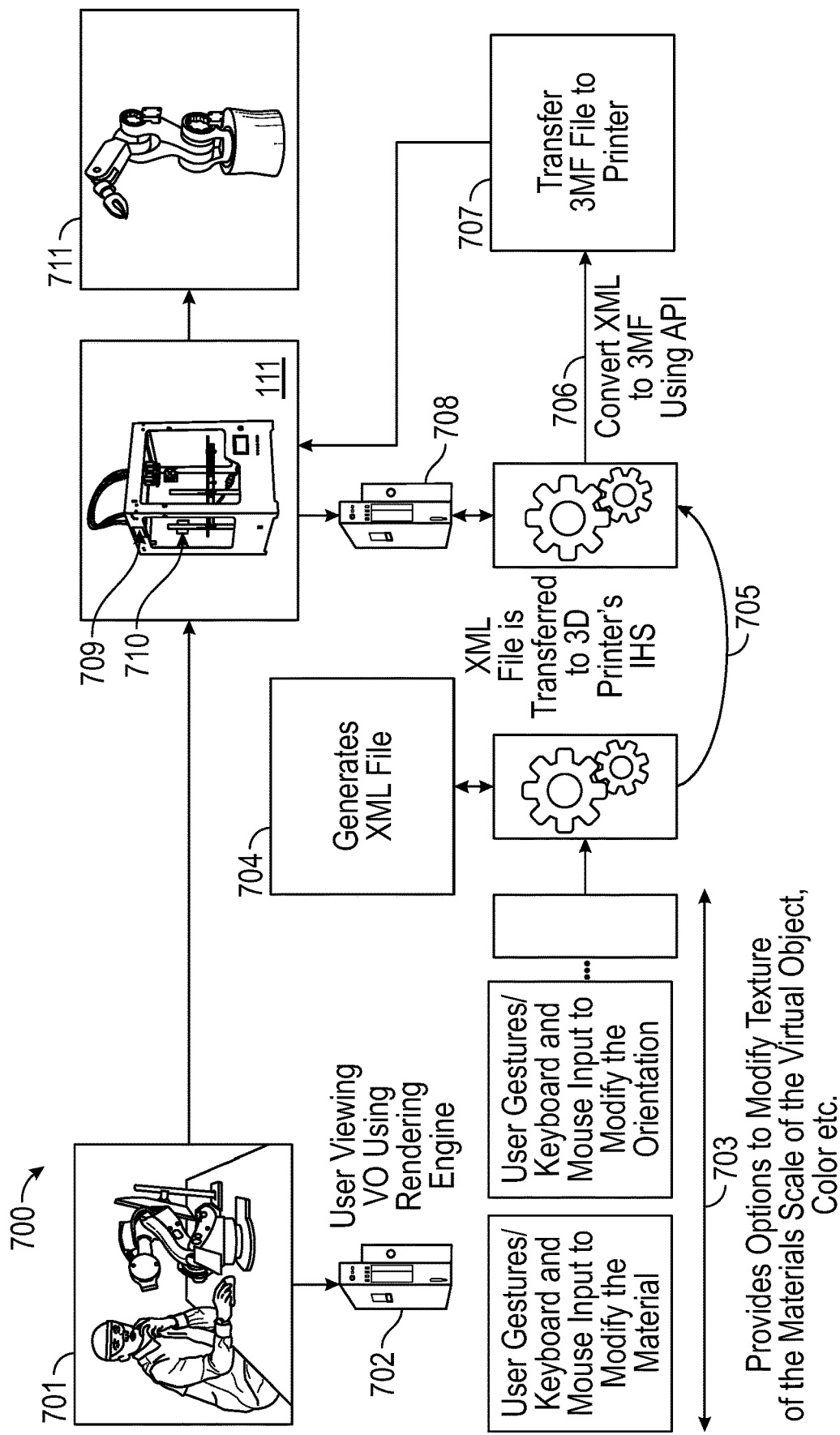
FIG. 7 is a diagram of operations in an example use-case, according to some embodiments.

FIG. 7 is a diagram of an example of use-case 700, according to some embodiments. Particularly, while in environment 701, as part of operation 702, a user wearing an HMD views a VO using rendering engine 301 executed by host IHS 103. In operation 703, the user uses gestures and/or other inputs (e.g., keyboard, mouse, voice, etc.) to modify one or more aspects of the VO, such as the material, color, orientation, scale, etc. Then, in operation 704, host IHS 103 generates an XML file, for example, with a 3D Manufacturing Format (3MF) data format.

In operation 705 (e.g., in response to a user's gesture), the XML file may be transferred to 3D printer 111, which in this case is controlled by its own IHS 708. 3D printer 111 may be identified and/or located via external fiducial marks 709 (on the frame of 3D printer 111) and/or internal fiducial marks 710 (at or near the print or build area within 3D printer 111); which may be tracked using camera 108 in HMD 102, for example. At operation 706, IHS 708 converts the XML, file to a binary 3MF format, for instance, using a WINDOWS API or the like. Then, at operation 707, the binary 3MF file is used by printer 111 to produce physical instance 711 of the VO.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a host processor; and
a memory coupled to the host processor, the memory having program instructions stored thereon that, upon execution, cause the IHS to:
generate a first electronic file in an Extensible Markup Language (XML) format, wherein the first XML file describes a virtual object;
produce the virtual object for display by a Head-Mounted Device (HMD) coupled to the IHS during execution of a virtual, augmented, or mixed reality (xR) application;
execute a command with respect to the virtual object to produce a manipulated virtual object displayed by the HMD;
generate a second electronic file in XML format, wherein the second XML file describes the manipulated virtual object, wherein the electronic file describing the manipulated virtual object is created by modifying the first electronic file describing the virtual object to incorporate at least one change to a physical characteristic of the virtual object;
transmit the second electronic file to a three-dimensional (3D) printer coupled to the IHS, wherein the second electronic file enables the 3D printer to build a physical instance of the manipulated virtual object;
produce a time-lapse pre-build of the manipulated virtual object for display by the HMD; and
overlay the time-lapse pre-build of the manipulated virtual object over a print area of the 3D printer to permit the user to watch the time-lapse pre-build.

2. The IHS of claim 1, wherein the virtual object is displayed by the HMD as a digital image overlaid upon a user's natural visual perception of a surrounding physical environment.

3. The IHS of claim 2, wherein the command further comprises a gesture captured by the HMD.

4. The IHS of claim 3, wherein the gesture moves the manipulated virtual object to the print area of the 3D printer.

5. The IHS of claim 4, wherein the 3D printer is displayed by the HMD as a digitally-generated image.

6. The IHS of claim 4, wherein the 3D printer is naturally visible as part of a surrounding physical environment.

7. The IHS of claim 6, wherein the 3D printer further comprises a fiducial mark.

8. The IHS of claim 7, wherein the fiducial mark further comprises an infrared Light-Emitting Diode (LED).

9. The IHS of claim 7, wherein the program instructions, upon execution, further cause the IHS to determine that the gesture places the manipulated virtual object in the print area based upon detection of a position of the fiducial mark in the user's Field-of-View (FOV).

10. The IHS of claim 7, wherein the program instructions, upon execution, further cause the IHS to determine that the gesture places the manipulated virtual object in the print area based upon detection of a gaze focus matching a location of the print area.

11. The IHS of claim 1, wherein the program instructions, upon execution, further cause the IHS to:
instruct the 3D printer to initiate reproduction of the physical instance of the manipulated virtual object; and
overlay the virtual object over the physical instance concurrently with the physical instance being built by the 3D printer.

12. The IHS of claim 1, wherein the program instructions, upon execution, further cause the IHS to convert the XML format to a 3D Manufacturing Format (3MF) format using an Application Programming Interface (API) prior to the transmission.

13. A hardware memory device having program instructions stored thereon that, upon execution by a hardware processor of a three-dimensional (3D) printer, cause the 3D printer to:
receive an electronic file corresponding to a manipulated virtual object from an Information Handling System (IHS) coupled to a Head-Mounted Device (HMD) during execution of a virtual, augmented, or mixed reality (xR) application, wherein a virtual object is produced by the IHS during the xR application, wherein the IHS is configured to execute a command with respect to the virtual object to produce a manipulated virtual object, wherein the electronic file corresponding to the manipulated virtual object is created by modifying an electronic file corresponding to the virtual object to incorporate at least one change to a physical characteristic of the virtual object, wherein the electronic file corresponding to the manipulated virtual incorporates at least one configuration option for printing the manipulated virtual object, wherein the configuration option includes at least one of: a type of material to be injected or a type of nozzle used, and wherein the electronic file corresponding to the manipulated virtual object and the electronic file corresponding to the virtual object are not the same electronic file; and
build a physical instance of the manipulated virtual object.

14. The hardware memory of claim 13, wherein the virtual object is displayed by the HMD as a digital image overlaid upon a user's natural visual perception of a surrounding physical environment.

15. The hardware memory of claim 13, wherein the command further comprises a gesture captured by the HMD, wherein the gesture moves the manipulated virtual object to a print area of the 3D printer.

16. The hardware memory of claim 15, wherein the program instructions, upon execution, further cause the IHS to determine that the gesture places the manipulated virtual object in the print area based upon detection of a position of one or more fiducial marks coupled to the printer and present in the user's Field-of-View (FOV).

17. The hardware memory of claim 15, wherein the program instructions, upon execution, further cause the IHS to determine that the gesture places the manipulated virtual object in the print area based upon detection of a gaze focus matching a location of the print area.

18. A method, comprising:
generating a first electronic file in an Extensible Markup Language (XML) format, wherein the first XML file describes a virtual object;
producing a virtual object for display by a Head-Mounted Device (HMD) coupled to the IHS during execution of a virtual, augmented, or mixed reality (xR) application;
executing a command with respect to the virtual object to produce a manipulated virtual object displayed by the HMD;
transmitting a second electronic file corresponding to the manipulated virtual object to a three-dimensional (3D) printer coupled to the IHS, wherein the second electronic file enables the 3D printer to build a physical instance of the manipulated virtual object, and wherein the second electronic file corresponding to the manipulated virtual object is created by modifying a first electronic file corresponding to the virtual object to incorporate at least one change to a physical characteristic of the virtual object; and transmitting at least one configuration option for printing the manipulated virtual object to the 3D printer based upon a second command, wherein the second command comprises a gesture captured by the HMD, and wherein the configuration option includes a texture.

19. The method of claim 18, further comprising:

instructing the 3D printer to initiate reproduction of the physical instance of the manipulated virtual object; and overlaying the virtual object over the physical instance concurrently with the physical instance being built by the 3D printer.

20. The method of claim 18, further comprising converting the electronic file from an Extensible Markup Language (XML) format to a 3D Manufacturing Format (3MF) format using an Application Programming Interface (API).

* * * * *

UNITED STATES PATENT AND TRADEMARK OFFICE
CERTIFICATE OF CORRECTION

PATENT NO. : 11,422,530 B2  
APPLICATION NO. : 16/105188  
DATED : August 23, 2022  
INVENTOR(S) : Seibert et al.

Page 1 of 1

It is certified that error appears in the above-identified patent and that said Letters Patent is hereby corrected as shown below:

In the Claims

In Column 14, Line 23-24, Claim 13, delete "electronic file corresponding to the manipulated virtual incorporates" and insert -- electronic file corresponding to the manipulated virtual object incorporates -- therefor.

Signed and Sealed this  
Twenty-seventh Day of September, 2022

Katherine Kelly Vidal  
*Director of the United States Patent and Trademark Office*